United States Patent
Huang

(10) Patent No.: US 12,460,034 B2
(45) Date of Patent: Nov. 4, 2025

(54) FIBER

(71) Applicant: INDUSTRIAL TECHNOLOGY RESEARCH INSTITUTE, Hsinchu (TW)

(72) Inventor: Kuan-Yeh Huang, Baoshan Township (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 380 days.

(21) Appl. No.: 18/090,099

(22) Filed: Dec. 28, 2022

(65) Prior Publication Data

US 2023/0159688 A1    May 25, 2023

Related U.S. Application Data

(62) Division of application No. 16/919,669, filed on Jul. 2, 2020, now Pat. No. 11,584,820.

(30) Foreign Application Priority Data

Mar. 13, 2020 (TW) .................................. 109108377

(51) Int. Cl.
| | | |
|---|---|---|
| *C08F 255/02* | (2006.01) | |
| *C08K 5/08* | (2006.01) | |
| *C08K 5/20* | (2006.01) | |
| *C08K 5/23* | (2006.01) | |
| *C08L 23/02* | (2025.01) | |
| *C08L 23/26* | (2025.01) | |
| *C08L 75/04* | (2006.01) | |

(52) U.S. Cl.
CPC .............. *C08F 255/02* (2013.01); *C08K 5/08* (2013.01); *C08K 5/20* (2013.01); *C08K 5/23* (2013.01); *C08L 23/02* (2013.01); *C08L 23/26* (2013.01); *C08L 75/04* (2013.01); *C08L 2205/03* (2013.01); *C08L 2205/08* (2013.01)

(58) Field of Classification Search
CPC .. C08L 2205/03; C08L 2205/08; C08L 23/02; C08L 75/04
See application file for complete search history.

(56) References Cited

U.S. PATENT DOCUMENTS

| | | | |
|---|---|---|---|
| 5,576,366 A | 11/1996 | Sheth | |
| 5,605,961 A * | 2/1997 | Lee | C08L 75/04 |
| | | | 525/66 |
| 7,237,780 B2 | 7/2007 | Ohki | |
| 7,824,764 B2 | 11/2010 | Berndt et al. | |
| 9,267,017 B2 | 2/2016 | Lebel et al. | |
| 2010/0035497 A1 | 2/2010 | Sierakowski et al. | |
| 2010/0292403 A1 | 11/2010 | Ansems et al. | |
| 2017/0174983 A1 | 6/2017 | Odeh et al. | |
| 2019/0136002 A1 | 5/2019 | Mercier et al. | |

FOREIGN PATENT DOCUMENTS

| | | |
|---|---|---|
| CN | 101605824 A | 12/2009 |
| CN | 101665603 A | 3/2010 |
| CN | 101319412 B | 12/2010 |
| CN | 102080277 A | 6/2011 |
| CN | 102964808 A | 3/2013 |
| CN | 104004343 A | 8/2014 |
| CN | 105696109 A | 6/2016 |
| CN | 105837947 A | 8/2016 |
| CN | 107881573 A | 4/2018 |
| CN | 104262946 B | 12/2018 |
| CN | 109206752 A | 1/2019 |
| CN | 109641083 A | 4/2019 |
| TW | 201611850 A | 4/2018 |
| TW | 201815542 A | 5/2018 |
| TW | 201825601 A | 7/2018 |

OTHER PUBLICATIONS

Chinese Ofice Action and Search Report for Chinese Application No. 202010371518.1, dated Feb. 21, 2023.
Chen et al., (Effect of TiO2 on thermal stability, flame retardancy properties of reduced graphene oxide/polypropylene nanocomposites, 21st international conference on composite materials, Xi'an, Aug. 20-25, 2017) (Year: 2017).
Fine-Blend (Fine-Blend CMG 9801, 2016) (Year: 2016).
Machine translation of CN-109206752-A (Year: 2019).
Taiwanese Office Action and Search Report dated Jul. 10, 2020 for Application No. 109108377.
Wanhua Chemical Wanthane WHT-1180 polyester Based TPU (Year: 2021).

* cited by examiner

*Primary Examiner* — Wenwen Cai

(74) *Attorney, Agent, or Firm* — Birch, Stewart, Kolasch & Birch, LLP

(57) ABSTRACT

A polymer blend is provided, which includes 100 parts by weight of a first polyolefin, 3 to 100 parts by weight of a thermoplastic polyurethane, and 3 to 10 parts by weight of a modified polyolefin. The modified polyolefin is formed by grafting maleic anhydride or acrylate onto a second polyolefin. The blend can be used to form fiber.

8 Claims, No Drawings

FIBER

CROSS REFERENCE TO RELATED APPLICATIONS

This application is a Divisional of pending U.S. patent application Ser. No. 16/919,669, filed on Jul. 2, 2020 and entitled "Polymer blend and fiber", which is based on, and claims priority from, Taiwan Application Serial Number 109108377, filed on Mar. 13, 2020, the disclosure of which is hereby incorporated by reference herein in its entirety.

TECHNICAL FIELD

The technical field relates to polymer blend, and in particular it relates to the polymer blend composition for fiber.

BACKGROUND

Polypropylene (PP) fiber has low density, low water content, good chemical resistance, and other properties. Moreover, PP fiber is very suitable for making outdoor sports clothing due to its low processing temperature, non-toxicity, easy recoverability, and other advantages. However, PP fiber holds less than 2% of the textiles market, due largely to the low polarity of PP fiber. As such, after being formed, a PP fiber cannot be dyed conventionally in water. The PP fiber should be dyed using the dope dying method, in which the colorant is mixed with PP during melt spinning to form a dyed yarn. The shortcomings of the dope dyeing method are less color change and insufficient color brightness, which is very unfavorable in the apparel business. As such, PP fiber occupies an extremely low global market share in outdoor sports clothing.

Accordingly, an economical, colorfast, and low-cost PP-based fiber raw material is called for to address the PP fiber problem of not easily being dyed in water.

SUMMARY

One embodiment of the disclosure provides a polymer blend, including: 100 parts by weight of a first polyolefin; 3 to 100 parts by weight of a thermoplastic polyurethane; and 3 to 10 parts by weight of a modified polyolefin, wherein the modified polyolefin is formed by grafting maleic anhydride or acrylate onto a second polyolefin.

In some embodiments of the polymer blend, the first polyolefin includes polyethylene, polypropylene, polybutylene, polyhexylene, or polyoctene, and the first polyolefin has a melt index of 10 g/10 min to 100 g/10 min at 230° C./2.16 kg.

In some embodiments of the polymer blend, the thermoplastic polyurethane has a Shore A hardness of 50 to 100 or a Shore D hardness of 40 to 70.

In some embodiments of the polymer blend, the modified polyolefin has a melt index of 10 g/10 min to 100 g/10 min at 230° C./2.16 kg.

In some embodiments of the polymer blend, the second polyolefin includes polyethylene, polypropylene, polybutylene, polyhexylene, or polyoctene, and the acrylate includes glycidyl methacrylate, methacrylate, methyl acrylate, benzyl acrylate, or hydroxyethyl methacrylate.

In some embodiments of the polymer blend, the second polyolefin and the maleic anhydride or acrylate have a weight ratio of 100:0.1 to 100:10.

One embodiment of the disclosure provides a fiber, including: 100 parts by weight of a first polyolefin; 3 to 15 parts by weight of a thermoplastic polyurethane; and 3 to 6 parts by weight of a modified polyolefin, wherein the modified polyolefin is formed by grafting maleic anhydride or acrylate onto a second polyolefin.

In some embodiments of the fiber, the first polyolefin includes polyethylene, polypropylene, polybutylene, polyhexylene, or polyoctene, and the first polyolefin has a melt index of 10 g/10 min to 100 g/10 min at 230° C./2.16 kg.

In some embodiments of the fiber, the thermoplastic polyurethane has a Shore A hardness of 50 to 100 or a Shore D hardness of 40 to 70.

In some embodiments of the fiber, the modified polyolefin has a mel index of 10 g/10 min to 100 g/10 min at 230° C./2.16 kg.

In some embodiments of the fiber, the second polyolefin includes polyethylene, polypropylene, polybutylene, polyhexylene, or polyoctene, and the acrylate includes glycidyl methacrylate, methacrylate, methyl acrylate, benzyl acrylate, or hydroxyethyl methacrylate.

In some embodiments of the fiber, the second polyolefin and the maleic anhydride or acrylate have a weight ratio of 100:0.1 to 100:10.

In some embodiments of the fiber, the first polyolefin and the thermoplastic polyurethane have a weight ratio of 100:6 to 100:15.

In some embodiments of the fiber, further including a dye for dyeing the fiber, and the dyeing is achieved by attach, adsorption, or diffusion.

In some embodiments of the fiber, the dye includes azo dye, nitroaniline dye, anthraquinone dye, or heterocyclic dye.

A detailed description is given in the following embodiments.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details.

One embodiment of the disclosure provides a polymer blend, including: 100 parts by weight of a first polyolefin; 3 to 100 parts by weight of a thermoplastic polyurethane; and 3 to 10 parts by weight of a modified polyolefin. If the thermoplastic polyurethane ratio is too low, the dyeing effect cannot be enhanced. If the thermoplastic polyurethane ratio is too high, a stable blend cannot be formed. If the modified polyolefin ratio is too low, a stable blend cannot be formed. If the modified polyolefin ratio is too high, a stable blend cannot be formed.

For example, the first polyolefin is a homopolymer of polyethylene, polypropylene, polybutylene, polyhexylene, or polyoctene, and the first polyolefin has a melt index of 10 g/10 min to 100 g/10 min at 230° C./2.16 kg. If the melt index of the first polyolefin is too low, a stable blend cannot be formed. If the melt index of the first polyolefin is too high, the polymer blend cannot be stably and continuously spun.

In some embodiments, the thermoplastic polyurethane has a Shore A hardness of 50 to 100 or a Shore D hardness of 40 to 70. If the hardness of the thermoplastic polyurethane is too low, the polymer blend cannot be stably and continuously spun. If the hardness of the thermoplastic polyurethane is too high, the polymer blend cannot be stably and continuously spun.

In one embodiment, the modified polyolefin is formed by grafting maleic anhydride or acrylate onto a second polyolefin. The second polyolefin includes polyethylene, polypropylene, polybutylene, polyhexylene, or polyoctene. The acrylate includes glycidyl methacrylate, methacrylate, methyl acrylate, benzyl acrylate, or hydroxyethyl methacrylate. The second polyolefin has a melt index of 10 g/10 min to 100 g/10 min at 230° C./2.16 kg. If the melt index of the second polyolefin is too low, the polymer blend cannot be stably and continuously spun. If the melt index of the second polyolefin is too high, the polymer blend cannot be stably and continuously spun. In one embodiment, the first polyolefin and the second polyolefin have the same type and the same melt index. In one embodiment, the first polyolefin and the second polyolefin have the same type but different melt indexes. In one embodiment, the first polyolefin and the second polyolefin have different types but similar melt indexes. In one embodiment, the first polyolefin and the second polyolefin have different melt indexes. In some embodiments, the modified polyolefin has a melt index of 10 g/10 min to 100 g/10 min at 230° C./2.16 kg. If the melt index of the modified polyolefin is too low, the polymer blend cannot be stably and continuously spun. If the melt index of the modified polyolefin is too high, the polymer blend cannot be stably and continuously spun.

In some embodiments, the second polyolefin and the maleic anhydride (or the acrylate) have a weight ratio of 100:0.1 to 100:10. If the maleic anhydride or the acrylate ratio is too low, a stable blend cannot be formed. If the maleic anhydride or the acrylate ratio is too high, the polymer blend cannot be stably and continuously spun as silk. The method of modifying the polyolefin can be referred to Taiwan Patent No. 1443117, and the detailed description is not repeated here. The polymer blend can be used to form fiber, but the polymer blend of some content ratios cannot be spun to form fiber. The polymer blend suitable for the fiber includes 100 parts by weight of the first polyolefin, 3 to 15 parts by weight of the thermoplastic polyurethane, and 3 to 6 parts by weight of the modified polyolefin, wherein the modified polyolefin is formed by grafting maleic anhydride or acrylate onto the second polyolefin. If the thermoplastic polyurethane ratio is too low, the polymer blend cannot be stably and continuously spun. If the thermoplastic polyurethane ratio is too high, the polymer blend cannot be spun to form a fiber. If the modified polyolefin ratio is too low, the polymer blend cannot be stably and continuously spun. If the modified polyolefin ratio is too high, the polymer blend cannot be spun to form a fiber. The types of the first polyolefin, the second polyolefin, and the acrylate are similar to those described above, and the detailed description thereof is not repeated here.

Note that not all the fibers are suitable for dyeing. For example, in the fiber suitable for dyeing, the first polyolefin and the thermoplastic polyurethane have a weight ratio of 100:6 to 100:15, and the first polyolefin and the modified polyolefin have a weight ratio of 100:3 to 100:6. If the thermoplastic polyurethane ratio is too low, the fiber cannot be efficiently dyed. If the thermoplastic polyurethane ratio is too high, the polymer blend cannot be stably and continuously spun. If the modified polyolefin ratio is too low, the polymer blend cannot be stably and continuously spun. If the modified polyolefin ratio is too high, the fiber cannot be efficiently dyed.

In some embodiments, the fiber can be dyed by attaching, adsorption, or diffusion to achieve purpose of dyeing. The dye used for dyeing the fiber includes azo dye, nitroaniline dye, anthraquinone dye, or heterocyclic dye. For example, the dye can be Everdirect Yellow RL, Everdirect Supra Blue GDL, Everdirect Supra Blue BRR, or Everdirect Blue FFRL commercially available from Everlight Chemical. Because the fiber is formed from the polymer blend having the polyolefin, the thermoplastic polyurethane, and the modified polyolefin of appropriate ratio, the dyeing effect of the polyolefin-based fiber can be efficiently improved.

Below, exemplary embodiments will be described in detail so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Example 1

2.0 kg of polypropylene pellet (PP, melt index was 14 g/min@230° C./2.16 kg, 6331 commercially available from LCY Chemical Co.) was fed into a twin screw extruder. Subsequently, 200 g of glycidyl methacrylate (GMA, commercially available from Sigma-Aldrich) and 2.0 g of 3,6,9-triethyl-3,6,9-trimethyl-1,4,7-triepoxy nonane serving as peroxide radical initiator (commercially available from Sigma-Aldrich) were side fed into the twin screw extruder to form graft modified polypropylene (PP-g-GMA). The screw feeding inlet temperature was 20° C., the injection temperature was 190° C., and the screw rotation speed was 200 rpm. PP-g-GMA was analyzed by titration to determine its grafting amount (about 6.2 wt %). PP-g-GMA had a melt index of 28 g/10 min@230° C./2.16 kg. The injected PP-g-GMA was extruded out as stripe through water to be pelletized, and then dried in an oven at 100° C. for 4 hours. The melt index of PP-g-GMA was measured according to the standard ASTM-D1238.

100 g of PP-g-GMA pellets, 1.7 kg of PP pellets (melt index was 25 g/10 min@230° C./2.16 kg, S2123 commercially available from Formosa Chemicals and Fiber Co.), and 200 g of thermoplastic polyurethane pellet (TPU, hardness was 92 Shore A, 1090 A commercially available from Great Eastern Resins Industrial Co. Ltd.) were mixed and disposed into a twin screw extruder to be blended. The screw feeding inlet temperature was 20° C., the injection section temperature was 200° C., and the screw rotation speed was 200 rpm. The polymer blend had a melt index of 19.41 g/min@230° C./2.16 kg. The injected polymer blend was pulled as stripe through water to be pelletized, and then dried in an oven at 100° C. for 8 hours.

2000 g of the polymer blend was disposed into a melt spinning machine to be spun. The screw feeding inlet temperature was 20° C., the injection section temperature was 240° C., and the screw rotation speed was 20 rpm. 2% on weight of fiber (o.w.f) of dye and 0.5 g/L of levelling agent were added into a dyeing steel cup. 1 g/L of acetic acid was added into the dyeing steel cup to adjust pH value, and water was added into the dyeing steel cup to achieve the weight ratio of the fiber to be dyed and the total liquid amount (1:60). The polymer blend fiber was then disposed into the dyeing steel cup, and the dyeing steel cup was disposed into a dyeing machine. The heating curve of the dyeing machine was set at a rate of +2° C./min, kept at 120°

C. for 60 minutes, and cooled down at a rate of −2° C./min to 80° C. After the dyeing process was completed, the polymer blend fiber was taken and cooled down with cold water to room temperature. The dyed fiber was further washed with clean water and then chemical reduction washed. In the chemical reduction wash, the fiber was washed in a solution of sodium dithionite (3 g/L) and sodium hydroxide (2 g/L) at 85° C. for 15 minutes, in which the fiber and the solution had a weight ratio of 1:60. The chemical reduction washed fiber was taken and cooled down with cold water to room temperature. The dyed fiber was cleaned with clean water and then dried.

The dyeing depth (K/S, analyzed by spectrophotometer) and the color fastness to washing with six fiber stripes (ISO 105 C06: 2010 (Textiles-Test for Color Fastness-PartC06: Color Fastness to Domestic and Commercial Laundering)) of the above fiber to the yellow dye (Everdirect Yellow RL commercially available from Everlight Chemical) and the blue dye (Everdirect Supra Blue GDL commercially available from Everlight Chemical) are tabulated in Table 1.

Example 2

2.0 kg of PP pellet (6331 commercially available from LCY Chemical Co.) was fed into a twin screw extruder. Subsequently, 100 g of GMA and 2.0 g of 3,6,9-triethyl-3,6,9-trimethyl-1,4,7-triepoxy nonane serving as peroxide radical initiator were side fed into the twin screw extruder to form graft modified polypropylene (PP-g-GMA). The screw feeding inlet temperature was 20° C., the injection temperature was 190° C., and the screw rotation speed was 200 rpm. PP-g-GMA had a grafting amount of about 3.8 wt % and a melt index of 21 g/min@230° C./2.16 kg. The injected PP-g-GMA was pulled as stripe through water to be pelletized, and then dried in an oven at 100° C. for 4 hours.

100 g of PP-g-GMA pellets, 1.7 kg of PP pellets (S2123 commercially available from Formosa Chemicals and Fiber Co.), and 200 g of TPU pellet (1090 A commercially available from Great Eastern Resins Industrial Co. Ltd.) were mixed and disposed into a twin screw extruder to be blended. The screw feeding inlet temperature was 20° C., the injection section temperature was 200° C., and the screw rotation speed was 200 rpm. The polymer blend had a melt index of 35 g/min@230° C./2.16 kg. The injected polymer blend was pulled as stripe through water to be pelletized, and then dried in an oven at 100° C. for 8 hours.

2000 g of the polymer blend was disposed into a melt spinning machine to be spun. The screw feeding inlet temperature was 20° C., the injection section temperature was 240° C., and the screw rotation speed was 20 rpm. 2% o.w.f. of dye and 0.5 g/L of levelling agent were added into a dyeing steel cup. 1 g/L of acetic acid was added into the dyeing steel cup to adjust pH value, and water was added into the dyeing steel cup to achieve the weight ratio of the fiber to be dyed and the total liquid amount (1:60). The polymer blend fiber was then disposed into the dyeing steel cup, and the dyeing steel cup was disposed into a dyeing machine. The heating curve of the dyeing machine was set at a rate of +2° C./min, kept at 120° C. for 60 minutes, and cooled down at a rate of −2° C./min to 80° C. After the dyeing process was completed, the polymer blend fiber was taken and cooled down with cold water to room temperature. The dyed fiber was further washed by clean water and then chemical reduction washed. In the chemical reduction wash, the fiber was in a solution of sodium dithionite (3 g/L) and sodium hydroxide (2 g/L) at 85° C. for 15 minutes, in which the fiber and the solution had a weight of 1:60. The chemical reduction washed fiber was taken and cooled down with cold water to room temperature. The dyed fiber was cleaned with clean water and then dried.

The dyeing depth (K/S, analyzed by spectrophotometer) and the color fastness to washing with six fiber stripes (ISO 105 C06: 2010 (Textiles-Test for Color Fastness-PartC06: Color Fastness to Domestic and Commercial Laundering)) of the above fiber to the yellow dye (Everdirect Yellow RL commercially available from Everlight Chemical) and the blue dye (Everdirect Supra Blue GDL commercially available from Everlight Chemical) are tabulated in Table 1.

Example 3

2.0 kg of PP pellets (6331 commercially available from LCY Chemical Co.) was fed into a twin screw extruder. Subsequently, 50 g of GMA and 2.0 g of 3,6,9-triethyl-3,6,9-trimethyl-1,4,7-triepoxy nonane serving as peroxide radical initiator were side fed into the twin screw extruder to form graft modified polypropylene (PP-g-GMA). The screw feeding inlet temperature was 20° C., the injection temperature was 190° C., and the screw rotation speed was 200 rpm. PP-g-GMA had a grafting amount of about 2.3 wt % and a melt index of 24 g/min@230° C./2.16 kg. The injected PP-g-GMA was pulled as stripe through water to be pelletized, and then dried in an oven at 100° C. for 4 hours.

100 g of PP-g-GMA pellet, 1.7 kg of PP pellet (S2123 commercially available from Formosa Chemicals and Fiber Co.), and 200 g of TPU pellet (1090 A commercially available from Great Eastern Resins Industrial Co. Ltd.) were mixed and disposed into a twin screw extruder to be blended. The screw feeding inlet temperature was 20° C., the injection section temperature was 200° C., and the screw rotation speed was 200 rpm. The polymer blend had a melt index of 36 g/min@230° C./2.16 kg. The injected polymer blend was pulled as stripe through water to be pelletized, and then dried in an oven at 100° C. for 8 hours.

2000 g of the polymer blend was disposed into a melt spinning machine to be spun. The screw feeding inlet temperature was 20° C., the injection section temperature was 240° C., and the screw rotation speed was 20 rpm. 2% o.w.f. of dye and 0.5 g/L of levelling agent were added into a dyeing steel cup. 1 g/L of acetic acid was added into the dyeing steel cup to adjust pH value, and water was added into the dyeing steel cup to achieve the weight ratio of the fiber to be dyed and the total liquid amount (1:60). The polymer blend fiber was then disposed into the dyeing steel cup, and the dyeing steel cup was disposed into a dyeing machine. The heating curve of the dyeing machine was set at a rate of +2° C./min, kept at 120° C. for 60 minutes, and cooled down at a rate of −2° C./min to 80° C.). After the dyeing process was completed, the polymer blend fiber was taken and cooled down with cold water to room temperature. The dyed fiber was further washed with clean water and then chemical reduction washed. In the chemical reduction wash, the fiber was washed in a solution of sodium dithionite (3 g/L) and sodium hydroxide (2 g/L) at 85° C. for 15 minutes, in which the fiber and the solution had a weight ratio of 1:60. The chemical reduction washed fiber was taken and cooled down in cold water to room temperature. The dyed fiber was cleaned by clean water and then dried.

The dyeing depth (K/S, analyzed by spectrophotometer) and the color fastness to washing with six fiber stripes (ISO 105 C06: 2010 (Textiles-Test for Color Fastness-PartC06: Color Fastness to Domestic and Commercial Laundering)) of the above fiber to the yellow dye (Everdirect Yellow RL commercially available from Everlight Chemical) and the blue dye (Everdirect Supra Blue GDL commercially available from Everlight Chemical) are tabulated in Table 1.

Comparative Example 1

100 g of PP-g-GMA pellet from Example 1, 1.7 kg of PP pellet (S2123 commercially available from Formosa Chemicals and Fiber Co.), and 200 g of polyethylene terephthalate pellet (PET, commercially available from SHINKONG SYNTHETIC FIBERS CO.) were mixed and disposed into a twin screw extruder to be blended. The screw feeding inlet temperature was 20° C., the injection section temperature was 200° C., and the screw rotation speed was 200 rpm. The polymer blend had a melt index of 32 g/min@230° C./2.16 kg. The injected polymer blend was pulled as stripe through water to be pelletized, and then dried in an oven at 100° C. for 8 hours.

2000 g of the polymer blend was disposed into a melt spinning machine to be spun. The screw feeding inlet temperature was 20° C., the injection section temperature was 240° C., and the screw rotation speed was 20 rpm. 2% o.w.f. of dye and 0.5 g/L of leveling agent were added into a dyeing steel cup. 1 g/L of acetic acid was added into the dyeing steel cup to adjust pH value, and water was added into the dyeing steel cup to achieve the weight ratio of the fiber to be dyed and the total liquid amount (1:60). The polymer blend fiber was then disposed into the dyeing steel cup, and the dyeing steel cup was disposed into a dyeing machine. The heating curve of the dyeing machine was set at a rate of +2° C./min, kept at 120° C. for 60 minutes, and cooled down at a rate of −2° C./min to 80° C.). After the dyeing process was completed, the polymer blend fiber was taken and cooled down with cold water to room temperature. The dyed fiber was further washed with clean water and then chemical reduction washed. In the chemical reduction wash, the fiber was washed in a solution of sodium dithionite (3 g/L) and sodium hydroxide (2 g/L) at 85° C. for 15 minutes, in which the fiber and the solution had a weight ratio of 1:60. The chemical reduction washed fiber was taken and cooled down with cold water to room temperature. The dyed fiber was cleaned with clean water and then dried.

The dyeing depth (K/S, analyzed by spectrophotometer) and the color fastness to washing with six fiber stripes (ISO 105 C06: 2010 (Textiles-Test for Color Fastness-PartC06: Color Fastness to Domestic and Commercial Laundering)) of the above fiber to the yellow dye (Everdirect Yellow RL commercially available from Everlight Chemical) and the blue dye (Everdirect Supra Blue GDL commercially available from Everlight Chemical) are tabulated in Table 1.

Comparative Example 2-1

11.1 g of PP-g-GMA pellet from Example 1, 100 g of PP pellet (S2123 commercially available from Formosa Chemicals and Fiber Co.), and 111.1 g of TPU pellet (1090 A commercially available from Great Eastern Resins Industrial Co. Ltd.) were mixed and disposed into a twin screw extruder to be blended. The screw feeding inlet temperature was 20° C., the injection section temperature was 200° C., and the screw rotation speed was 200 rpm. The above polymer blend could not be stably injected out.

Comparative Example 2-2

14.3 g of PP-g-GMA pellet from Example 1, 100 g of PP pellet (S2123 commercially available from Formosa Chemicals and Fiber Co.), and 171.4 g of TPU pellet (1090 A commercially available from Great Eastern Resins Industrial Co. Ltd.) were mixed and disposed into a twin screw extruder to be blended. The screw feeding inlet temperature was 20° C., the injection section temperature was 200° C., and the screw rotation speed was 200 rpm. The above polymer blend could not be stably injected out.

Comparative Example 2-3

20 g of PP-g-GMA pellet from Example 1, 100 g of PP pellet (S2123 commercially available from Formosa Chemicals and Fiber Co.), and 280 g of TPU pellet (1090 A commercially available from Great Eastern Resins Industrial Co. Ltd.) were mixed and disposed into a twin screw extruder to be blended. The screw feeding inlet temperature was 20° C., the injection section temperature was 200° C., and the screw rotation speed was 200 rpm. The above polymer blend could not be stably injected out.

As shown in Comparative Examples 2-1 to 2-3, the blend could not be stably formed if TPU amount is greater than PP amount.

Comparative Example 3-1

6.3 g of PP-g-GMA pellet from Example 1, 100 g of PP pellet (S2123 commercially available from Formosa Chemicals and Fiber Co.), and 18.8 g of TPU pellet (1090 A commercially available from Great Eastern Resins Industrial Co. Ltd.) were mixed and disposed into a twin screw extruder to be blended. The screw feeding inlet temperature was 20° C., the injection section temperature was 200° C., and the screw rotation speed was 200 rpm. The injected polymer blend was pulled as stripe through water to be

TABLE 1

| | | | Color fastness to washing with six fiber stripes | | | | | |
|---|---|---|---|---|---|---|---|---|
| | Dye | K/S | Acetic acid | Cotton | Nylon | Polyester | Polyacrylate | Wool |
| Example 1 | Yellow | 18.6 | 5 | 5 | 5 | 5 | 5 | 5 |
| | Blue | 19.7 | 4~5 | 5 | 4 | 4~5 | 5 | 4~5 |
| Example 2 | Yellow | 14.4 | 4~5 | 5 | 4~5 | 4~5 | 5 | 4~5 |
| | Blue | 17.9 | 4~5 | 4~5 | 4~5 | 4~5 | 5 | 4~5 |
| Example 3 | Yellow | 14.2 | 5 | 5 | 5 | 5 | 5 | 5 |
| | Blue | 9.7 | 5 | 5 | 5 | 5 | 5 | 5 |
| Comparative | Yellow | 10.6 | 5 | 5 | 5 | 5 | 5 | 5 |
| Example 1 | Blue | 8.0 | 5 | 5 | 5 | 5 | 5 | 5 |

Accordingly, the fiber formed from the blend of PP, TPU, and PP-g-GMA in Examples 1 to 3 had a better dyeing effect. When the fiber was free of TPU component (e.g. Comparative Example 1), the dyeing effect was negatively influenced.

pelletized, and then dried in an oven at 100° C. for 8 hours. The above polymer blend could not be spun to form fiber.

Comparative Example 3-2

7.7 g of PP-g-GMA pellet from Example 1, 100 g of PP pellet (S2123 commercially available from Formosa Chemicals and Fiber Co.), and 46.2 g of TPU pellet (1090 A commercially available from Great Eastern Resins Industrial Co. Ltd.) were mixed and disposed into a twin screw extruder to be blended. The screw feeding inlet temperature was 20° C., the injection section temperature was 200° C., and the screw rotation speed was 200 rpm. The injected polymer blend was pulled as stripe through water to be pelletized, and then dried in an oven at 100° C. for 8 hours. The above polymer blend could not be spun to form fiber.

Comparative Example 3-3

9.1 g of PP-g-GMA pellet from Example 1, 100 g of PP pellet (S2123 commercially available from Formosa Chemicals and Fiber Co.), and 72.7 g of TPU pellet (1090 A commercially available from Great Eastern Resins Industrial Co. Ltd.) were mixed and disposed into a twin screw extruder to be blended. The screw feeding inlet temperature was 20° C., the injection section temperature was 200° C., and the screw rotation speed was 200 rpm. The injected polymer blend was pulled as stripe through water to be pelletized, and then dried in an oven at 100° C. for 8 hours. The above polymer blend could not be spun to form fiber.

As shown in Comparative Examples 3-1 to 3-3, the polymer blend could not be spun to form fiber if PP and TPU had a weight ratio of lower than or equal to 100:18 and PP and PP-g-GMA had a weight ratio of lower than or equal to 100:6.3.

Comparative Example 4-1

5.3 g of PP-g-GMA pellet from Example 1, 100 g of PP pellet (S2123 commercially available from Formosa Chemicals and Fiber Co.), and 1.1 g of TPU pellet (1090 A commercially available from Great Eastern Resins Industrial Co. Ltd.) were mixed and disposed into a twin screw extruder to be blended. The screw feeding inlet temperature was 20° C., the injection section temperature was 200° C., and the screw rotation speed was 200 rpm. The injected polymer blend was pulled as stripe through water to be pelletized, and then dried in an oven at 100° C. for 8 hours.

2000 g of the polymer blend was disposed into a melt spinning machine to be spun. The screw feeding inlet temperature was 20° C., the injection section temperature was 240° C., and the screw rotation speed was 20 rpm. 2% o.w.f. of dye and 0.5 g/L of leveling agent were added into a dyeing steel cup. 1 g/L of acetic acid was added into the dyeing steel cup to adjust pH value, and water was added into the dyeing steel cup to achieve the weight ratio of the fiber to be dyed and the total liquid amount (1:60). The polymer blend fiber was then disposed into the dyeing steel cup, and the dyeing steel cup was disposed into a dyeing machine. The heating curve of the dyeing machine was set at a rate of +2° C./min, kept at 120° C. for 60 minutes, and cooled down at a rate of −2° C./min to 80° C.). After the dyeing process was completed, the polymer blend fiber was taken and cooled down with cold water to room temperature. The dyed fiber was further washed with clean water and then chemical reduction washed. In the chemical reduction wash, the fiber was washed in a solution of sodium dithionite (3 g/L) and sodium hydroxide (2 g/L) at 85° C. for 15 minutes, in which the fiber and the solution had a weight ratio of 1:60. The chemical reduction washed fiber was taken and cooled down with cold water to room temperature. The dyed fiber was cleaned with clean water and then dried.

The dyeing depth (K/S, analyzed by spectrophotometer) and the color fastness to washing with six fiber stripes (ISO 105 C06: 2010 (Textiles-Test for Color Fastness-PartC06: Color Fastness to Domestic and Commercial Laundering)) of the above fiber to the yellow dye (Everdirect Yellow RL commercially available from Everlight Chemical) and the blue dye (Everdirect Supra Blue GDL commercially available from Everlight Chemical) are tabulated in Table 2.

Comparative Example 4-2

5.4 g of PP-g-GMA pellet from Example 1, 100 g of PP pellet (S2123 commercially available from Formosa Chemicals and Fiber Co.), and 3.3 g of TPU pellet (1090 A commercially available from Great Eastern Resins Industrial Co. Ltd.) were mixed and disposed into a twin screw extruder to be blended. The screw feeding inlet temperature was 20° C., the injection section temperature was 200° C., and the screw rotation speed was 200 rpm. The injected polymer blend was pulled as stripe through water to be pelletized, and then dried in an oven at 100° C. for 8 hours.

2000 g of the polymer blend was disposed into a melt spinning machine to be spun. The screw feeding inlet temperature was 20° C., the injection section temperature was 240° C., and the screw rotation speed was 20 rpm. 2% o.w.f. of dye and 0.5 g/L of leveling agent were added into a dyeing steel cup. 1 g/L of acetic acid was added into the dyeing steel cup to adjust pH value, and water was added into the dyeing steel cup to achieve the weight ratio of the fiber to be dyed and the total liquid amount (1:60). The polymer blend fiber was then disposed into the dyeing steel cup, and the dyeing steel cup was disposed into a dyeing machine. The heating curve of the dyeing machine was set at a rate of +2° C./min, kept at 120° C. for 60 minutes, and cooled down at a rate of −2° C./min to 80° C.). After the dyeing process was completed, the polymer blend fiber was taken and cooled down with cold water to room temperature. The dyed fiber was further washed with clean water and then chemical reduction washed. In the chemical reduction wash, the fiber was washed in a solution of sodium dithionite (3 g/L) and sodium hydroxide (2 g/L) at 85° C. for 15 minutes, in which the fiber and the solution had a weight ratio of 1:60. The chemical reduction washed fiber was taken and cooled down with cold water to room temperature. The dyed fiber was cleaned with clean water and then dried.

The dyeing depth (K/S, analyzed by spectrophotometer) and the color fastness to washing with six fiber stripes (ISO 105 C06: 2010 (Textiles-Test for Color Fastness-PartC06: Color Fastness to Domestic and Commercial Laundering)) of the above fiber to the yellow dye (Everdirect Yellow RL commercially available from Everlight Chemical) and the blue dye (Everdirect Supra Blue GDL commercially available from Everlight Chemical) are tabulated in Table 2.

Comparative Example 4-3

5.6 g of PP-g-GMA pellet from Example 1, 100 g of PP pellet (S2123 commercially available from Formosa Chemicals and Fiber Co.), and 5.6 g of TPU pellet (1090 A commercially available from Great Eastern Resins Industrial Co. Ltd.) were mixed and disposed into a twin screw extruder to be blended. The screw feeding inlet temperature was 20° C., the injection section temperature was 200° C., and the screw rotation speed was 200 rpm. The injected polymer blend was pulled as stripe through water to be pelletized, and then dried in an oven at 100° C. for 8 hours.

2000 g of the polymer blend was disposed into a melt spinning machine to be spun. The screw feeding inlet temperature was 20° C., the injection section temperature was 240° C., and the screw rotation speed was 20 rpm. 2% o.w.f. of dye and 0.5 g/L of leveling agent were added into a dyeing steel cup. 1 g/L of acetic acid was added into the dyeing steel cup to adjust pH value, and water was added into the dyeing steel cup to achieve the weight ratio of the fiber to be dyed and the total liquid amount (1:60). The polymer blend fiber was then disposed into the dyeing steel cup, and the dyeing steel cup was disposed into a dyeing machine. The heating curve of the dyeing machine was set at a rate of +2° C./min, kept at 120° C. for 60 minutes, and cooled down at a rate of −2° C./min to 80° C.). After the dyeing process was completed, the polymer blend fiber was taken and cooled down with cold water to room temperature. The dyed fiber was further washed with clean water and then chemical reduction washed. In the chemical reduction wash, the fiber was washed in a solution of sodium dithionite (3 g/L) and sodium hydroxide (2 g/L) at 85° C. for 15 minutes, in which the fiber and the solution had a weight ratio of 1:60. The chemical reduction washed fiber was taken and cooled down with cold water to room temperature. The dyed fiber was cleaned with clean water and then dried.

The dyeing depth (K/S, analyzed by spectrophotometer) and the color fastness to washing with six fiber stripes (ISO 105 C06: 2010 (Textiles-Test for Color Fastness-PartC06: Color Fastness to Domestic and Commercial Laundering)) of the above fiber to the yellow dye (Everdirect Yellow RL commercially available from Everlight Chemical) and the blue dye (Everdirect Supra Blue GDL commercially available from Everlight Chemical) are tabulated in Table 2.

TABLE 2

| | Comparative Example 4-1 | Comparative Example 4-2 | Comparative Example 4-3 |
|---|---|---|---|
| PP | 100 | 100 | 100 |
| TPU | 1.1 | 3.3 | 5.6 |
| PP-g-GMA | 5.3 | 5.4 | 5.6 |
| K/S (Yellow) | 4.5 | 6.6 | 10.7 |
| K/S (Blue) | 3.8 | 4.2 | 9.3 |

As shown in Comparative Examples 4-1 to 4-3, the dyeing effect of the fiber would be not good if PP and TPU had a weight ratio of higher than or equal to 100:5.6.

It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:

1. A fiber, comprising:
   100 parts by weight of a first polyolefin;
   3 to 15 parts by weight of a thermoplastic polyurethane; and
   3 to 6 parts by weight of a modified polyolefin,
   wherein the modified polyolefin is formed by grafting maleic anhydride or acrylate onto a second polyolefin,
   wherein the first polyolefin is a homopolymer of polyethylene, polypropylene, polybutylene, polyhexylene, or polyoctene, and the first polyolefin has a melt index of 10 g/10 min to 100 g/10 min at 230° C./2.16 kg.

2. The fiber as claimed in claim 1, wherein the thermoplastic polyurethane has a Shore A hardness of 50 to 100 or a Shore D hardness of 40 to 70.

3. The fiber as claimed in claim 1, wherein the modified polyolefin has a melt index of 10 g/10 min to 100 g/10 min at 230° C./2.16 kg.

4. The fiber as claimed in claim 1, wherein the second polyolefin comprises polyethylene, polypropylene, polybutylene, polyhexylene, or polyoctene, and the acrylate comprises glycidyl methacrylate, methacrylate, methyl acrylate, benzyl acrylate, or hydroxyethyl methacrylate.

5. The fiber as claimed in claim 1, wherein the second polyolefin and the maleic anhydride or acrylate have a weight ratio of 100:0.1 to 100:10.

6. The fiber as claimed in claim 1, wherein the first polyolefin and the thermoplastic polyurethane have a weight ratio of 100:6 to 100:15.

7. The fiber as claimed in claim 6, further comprising a dye.

8. The fiber as claimed in claim 7, wherein the dye comprises azo dye, nitroaniline dye, anthraquinone dye, or heterocyclic dye.

* * * * *